US007003298B1

(12) United States Patent
Jagadeesan

(10) Patent No.: US 7,003,298 B1
(45) Date of Patent: Feb. 21, 2006

(54) DEVICES, SOFTWARES AND METHODS FOR HANDING OFF LIVE CALLS BETWEEN LEGS OF CSV AND VOX MODALITIES

(75) Inventor: Ramanathan T. Jagadeesan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 577 days.

(21) Appl. No.: 10/086,673

(22) Filed: Feb. 28, 2002

(51) Int. Cl.
H04Q 7/20 (2006.01)

(52) U.S. Cl. .................. 455/442; 455/436; 455/437; 455/445; 370/331; 370/352; 370/353; 370/354; 370/355; 370/356; 370/493

(58) Field of Classification Search .............. 455/442, 455/426.1, 445, 436; 370/352–356, 465, 370/331–333
See application file for complete search history.

(56) References Cited

U.S. PATENT DOCUMENTS

| | | | | |
|---|---|---|---|---|
| 5,101,501 A * | 3/1992 | Gilhousen et al. | .......... | 455/442 |
| 6,222,829 B1 * | 4/2001 | Karlsson et al. | ........... | 370/329 |
| 6,230,013 B1 * | 5/2001 | Wallentin et al. | ........... | 455/436 |
| 6,434,367 B1 * | 8/2002 | Kumar et al. | .................. | 455/70 |
| 6,501,952 B1 * | 12/2002 | Foster et al. | ................. | 455/436 |
| 6,504,828 B1 * | 1/2003 | Corbett | ....................... | 370/331 |
| 6,560,457 B1 * | 5/2003 | Silver et al. | ................ | 455/445 |
| 6,603,972 B1 * | 8/2003 | Sawyer | ....................... | 455/442 |
| 6,631,126 B1 * | 10/2003 | Berliner et al. | ............. | 370/342 |
| 6,678,524 B1 * | 1/2004 | Hansson et al. | ............ | 455/445 |
| 6,687,249 B1 * | 2/2004 | Noguera-Rodriguez et al. | ......................... | 370/331 |
| 6,708,031 B1 * | 3/2004 | Purnadi et al. | ............. | 455/436 |
| 6,714,781 B1 * | 3/2004 | Pecen et al. | ............. | 455/426.1 |
| 6,721,565 B1 * | 4/2004 | Ejzak et al. | ................ | 455/436 |
| 6,757,270 B1 * | 6/2004 | Kumar et al. | ............... | 370/342 |
| 6,792,273 B1 * | 9/2004 | Tellinger et al. | ........... | 455/442 |
| 6,834,192 B1 * | 12/2004 | Watanabe et al. | .......... | 455/436 |
| 6,889,045 B1 * | 5/2005 | Pan et al. | .................... | 455/436 |
| 6,907,245 B1 * | 6/2005 | Ohlsson et al. | ............. | 455/442 |
| 6,912,390 B1 * | 6/2005 | Andersson et al. | ......... | 455/436 |
| 2002/0147008 A1 * | 10/2002 | Kallio | ........................ | 455/426 |
| 2002/0151304 A1 * | 10/2002 | Hogan | ........................ | 455/436 |
| 2003/0104813 A1 * | 6/2003 | Julka et al. | ................. | 455/436 |
| 2003/0224795 A1 * | 12/2003 | Wilhoite et al. | ............ | 455/445 |
| 2004/0077349 A1 * | 4/2004 | Barak et al. | ................ | 455/436 |

* cited by examiner

Primary Examiner—William Trost
Assistant Examiner—Sharad Rampuria
(74) Attorney, Agent, or Firm—Marger Johnson & McCollom, P.C.

(57) ABSTRACT

Devices, softwares methods hand off a live call from an original leg of a first modality (such as Circuit Switched Voice) to an alternate leg of another modality (such as Voice over Internet Protocol). An original leg of a call is established using the first modality. Then the alternate leg of the call is established using the second modality, while the first leg is still established. Then the call is handed off from the original leg to the alternate leg, while the connection is active.

99 Claims, 9 Drawing Sheets

DEVICES, SOFTWARES AND METHODS FOR HANDING OFF LIVE CALLS BETWEEN LEGS OF CSV AND VOX MODALITIES

BACKGROUND OF THE INVENTION

1. Field of the Invention

The present invention is related to the field of handling voice telephone call connections, and more specifically to devices, softwares and methods for handing off voice telephone calls made between circuit switched telephone connections and data network packet switched connections.

2. Description of the Related Art

Traditionally telephone calls are handled through connections that use circuit switching. These connections are also known as circuit switched voice connections.

Current networks for cellular communication devices (such as cellular telephones) are characterized as 2 G/2.5 G, which means "second generation", and "second and a half generation". These, along with the first versions of 3 G ("third generation") cellular networks, use circuit switched connections for voice calls.

Packet switched networks, such as the internet, were initially intended to be for transmitting data, which is why they are also sometimes called data networks. Packet switched networks can also handle telephone calls. Connections for voice telephone calls through a network are also called packet switched connections.

In a packet switched connection across a data network, the voice data of a conversation is transmitted in data packets, using a suitable voice over data network (VoX) protocol. A VoX protocol, also known as merely VoX, is an application that operates on top of the data network. Such VoX protocols include but are not limited to the Voice over Internet Protocol (VoIP), the Voice over Frame Relay (VoFR) protocol, Voice over Asynchronous Transfer Mode (VoATM) protocol, etc.

Wireless LANs (Local Area Networks) are packet switched, and can provide voice service using VoX. These wireless LANs ("WLANs") include those operating under the IEEE 802.11b/a standard. "IEEE" stands for the Institute of Electrical and Electronics Engineers, an organization maintaining a website at <http://www.ieee.org/> at the time that this document is initially filed with the U.S.A. Patent Office.

For data transmission services, multimodal WLANs and cellular handsets might use either WLANs or cellular connections. In fact, it is even possible to perform a data handoff between legs of communication that are of disparate such modalities.

It is desired to have a way to hand off telephone call connections between the CSV modality and the VoX modality.

BRIEF SUMMARY OF THE INVENTION

The present invention overcomes these problems and limitations of the prior art.

Generally, the present invention provides devices, softwares and methods for handing off a live call from an original leg of a first modality (such as CSV) to an alternate leg of another modality (such as VoX). The devices may be wireless telephones, voice gateways, etc.

An original leg of a call is established using the first modality. Then the alternate leg of the call is established using the second modality, while the first leg is still established. Then the call is handed off from the original leg to the alternate leg, while the connection is active.

The invention offers the advantage that the handoff between the CSV modality and the VoX modality is automatic, without discontinuing the call. This enables providing voice service over a hybrid packet switched/circuit switched network, such as a WLAN/cellular network. Optionally it could take place automatically, without user activation.

The invention will become more readily apparent from the following Detailed Description, which proceeds with reference to the drawings, in which:

DETAILED DESCRIPTION OF THE PREFERRED EMBODIMENT(S)

As has been mentioned, the present invention provides devices, softwares and methods for handing off a live call from an original leg of a first modality to an alternate leg of another modality. The invention is now described in more detail.

Figure 1:
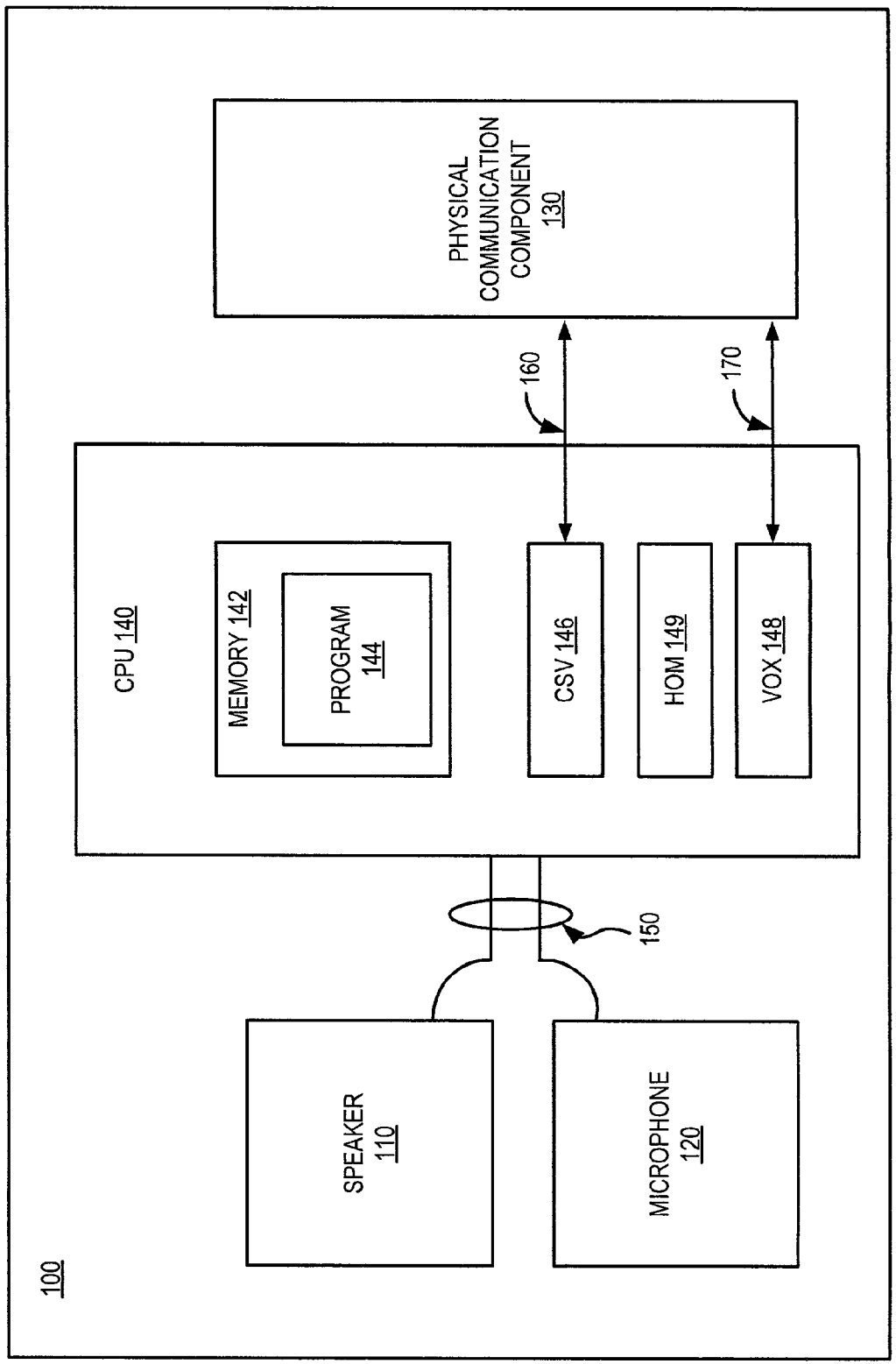
FIG. 1 is a block diagram of a wireless station made according to an embodiment of the invention.

Referring now to FIG. 1, a wireless station 100 made according to an embodiment of the invention is described in more detail. Wireless station 100 is a dual mode wireless device, such as a cellular telephone.

Station 100 includes a speaker 110, and a microphone 120, for use by a person.

Station 100 also includes a physical component 130 for wireless communication with other devices. Component 130 may include one or more transmitting and receiving antennas that use radio frequency (RF) waves. Component 130 may include two subcomponents (not shown separately), one for CSV and one for data network communication.

Station 100 also has a processor 140. Processor 140 may be implemented as a Digital Signal Processor (DSP), Central Processing Unit (CPU), or any other equivalent way known in the art.

Processor 140 includes a memory 142, on which a program 144 may reside. Functions of processor 140 may be controlled by program 144, as will become apparent from the below.

Station 100 is dual mode. This is implemented by processor 140 having a circuit switched voice (CSV) modality communication component 146, and a network voice (VoX) modality communication component 148.

In addition, processor 140 has a handoff functionality HOM 149, as will be described below. This operates to handoff calls between the two modes, as is described below. In some embodiments, handoff functionality HOM 149 may be implemented through program 144.

Processor 140 is coupled with speaker 110 and microphone 120 via a voice channel 150. In the case of device 100, voice channel 150 is internal, although that is not necessary for practicing the invention. A number of data paths may be considered as voice channels.

Processor 140 is also coupled with component 130. In particular, CSV component 146 is coupled with physical communication component 130 via CSV channel 160, and VoX component 148 is coupled with physical communication component 130 via VoX channel 170. If component 130 is made of two subcomponents, they are coupled accordingly. In other embodiments, physical communication component 130 may be part of processor 140.

Referring now to FIGS. 2A–2D, successive stages are illustrated as station 100 uses its handoff functionality HOM 149 to hand off a call according to the invention. In the example of FIGS. 2A–2D, a VoX call is established first, and is handed off to a circuit switched call.

In FIGS. 2A–2D, station 100 communicates with a device 220, which is also dual mode. In this example, device 220 has a CSV port 224 and a VoX port 226. In other embodiments, device 220 can have the same physical port for both communication modes. In yet other embodiments, device 220 can be two separate devices, of possibly different networks. One of these devices would include CSV port 224, and the other would include VoX port 226.

Device 220 ultimately communicates with a telephone (not shown), via a voice channel. That telephone includes a microphone and a speaker for use by another user. Communication can be direct, or involve other legs.

Figure 2A:
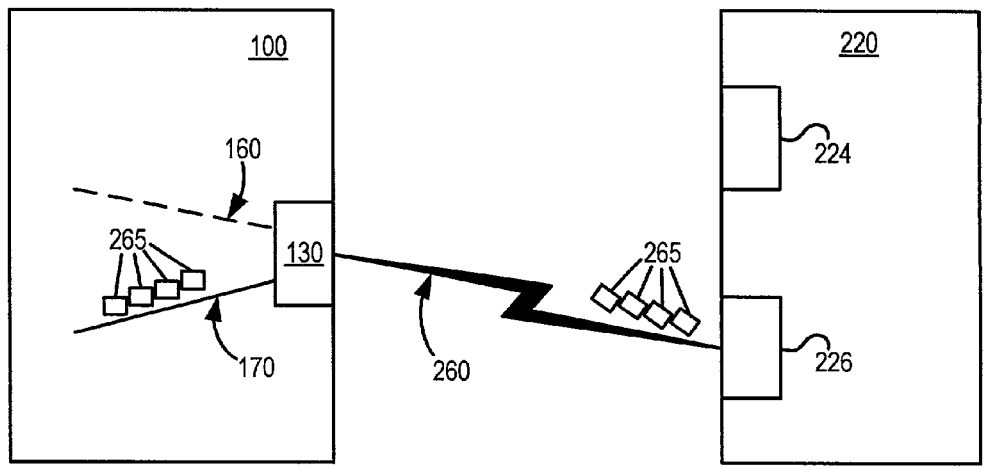
FIGS. 2A–2D are diagrams illustrating successive stages as the device of FIG. 1 implements a method according to the invention.

As seen in FIG. 2A, station 100 establishes a connection 260 with VoX port 226 of device 220. Connection 260 is further coupled with VoX channel 170. Packets 265 are exchanged over connection 260, and also over VoX channel 170 within station 100.

Figure 2B:
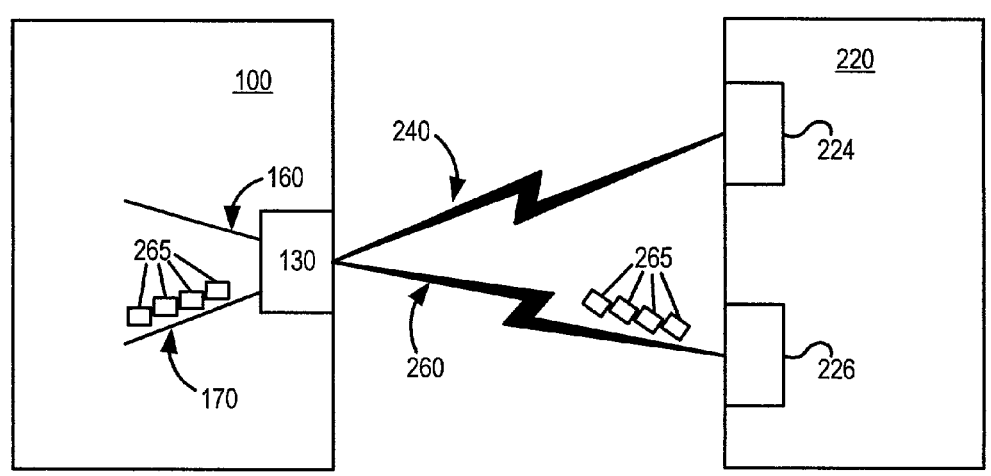

Next, as seen in FIG. 2B, station 100 also establishes a connection 240 with CSV port 224 of device 220. This is while connection 260 is still established, and further optionally while packets 265 are still being exchanged.

Figure 2C:
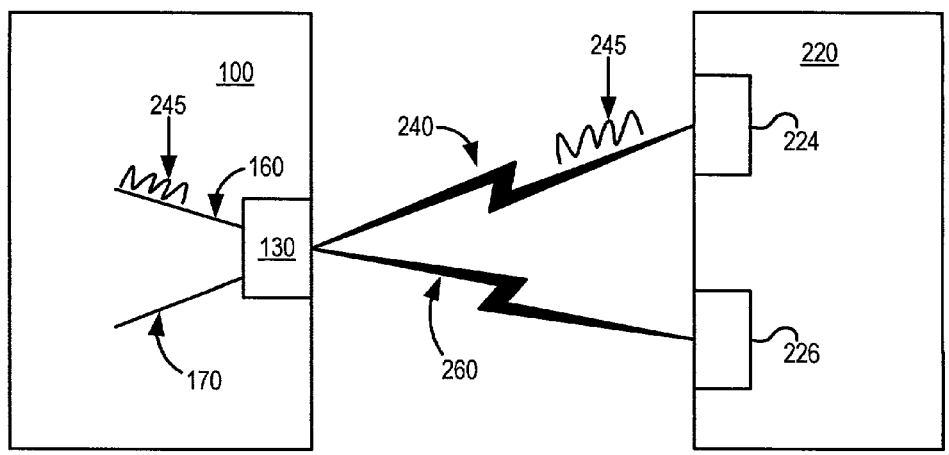

Next, as seen in FIG. 2C, signals 245 are exchanged over connection 240, and also over channel 160 within station 100. This may be while connection 260 is still established.

Figure 2D:
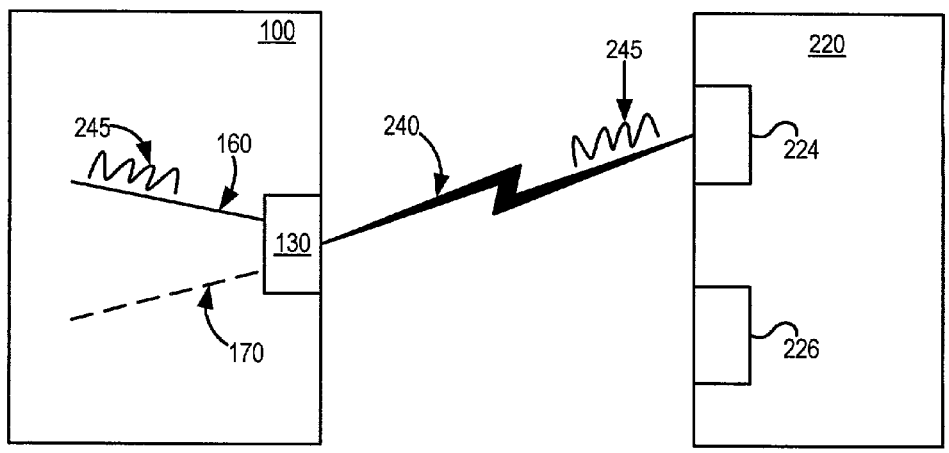

Next, as seen in FIG. 2D, connection 260 is torn down.

It will be appreciated that the illustrated sequence is a make-before-break sequence. In other words, connection 240 is made before connection 260 is torn down.

The shown sequence of stages is only one of many possible such sequences. For example, the sequence can be inverted, to start with a CSV and switch to VoX. The person skilled in the art will discern the technical implementation details.

One of the implementation features has to do with a decision of whether some of the initial signals for the handoff will be sent in-band (and may therefore be audible to the users), or out of band (better quality of service). These include the modality handoff signal, address signals, etc., as described later in this document.

Sending the initial signals out of band may require additional provisions. One group of embodiments may require the prior existence of a well-known server, such as a registration server. A handoff VoIP gateway would preregister with the well known server using a CSV-identifier (ANI/DN), and a corresponding VoX access address (which is preferably a port address). The CSV-identifier may be a dial Number (DN), or an Automatic Number Identification (ANI).

First, then, the original leg of a telephone call is established with a remote device using the CSV modality. Then the remote device registers with the registration server, with its CSV-identifier and corresponding VoX access address.

Then the hand-off takes place as follows. If the device does not know the VoX access address of the remote device, it queries the registration server using the CSV-ID (ANI/DN), to get the VoX access address.

Then a VoX handoff call, which contains at least an implicit or explicit handoff signal, is made to the remote device using the access address. The handoff signal includes the identifier (ANI/DN) of the CSV call-leg. Once the second leg has also established, handing off proceeds as described above.

Figure 3:
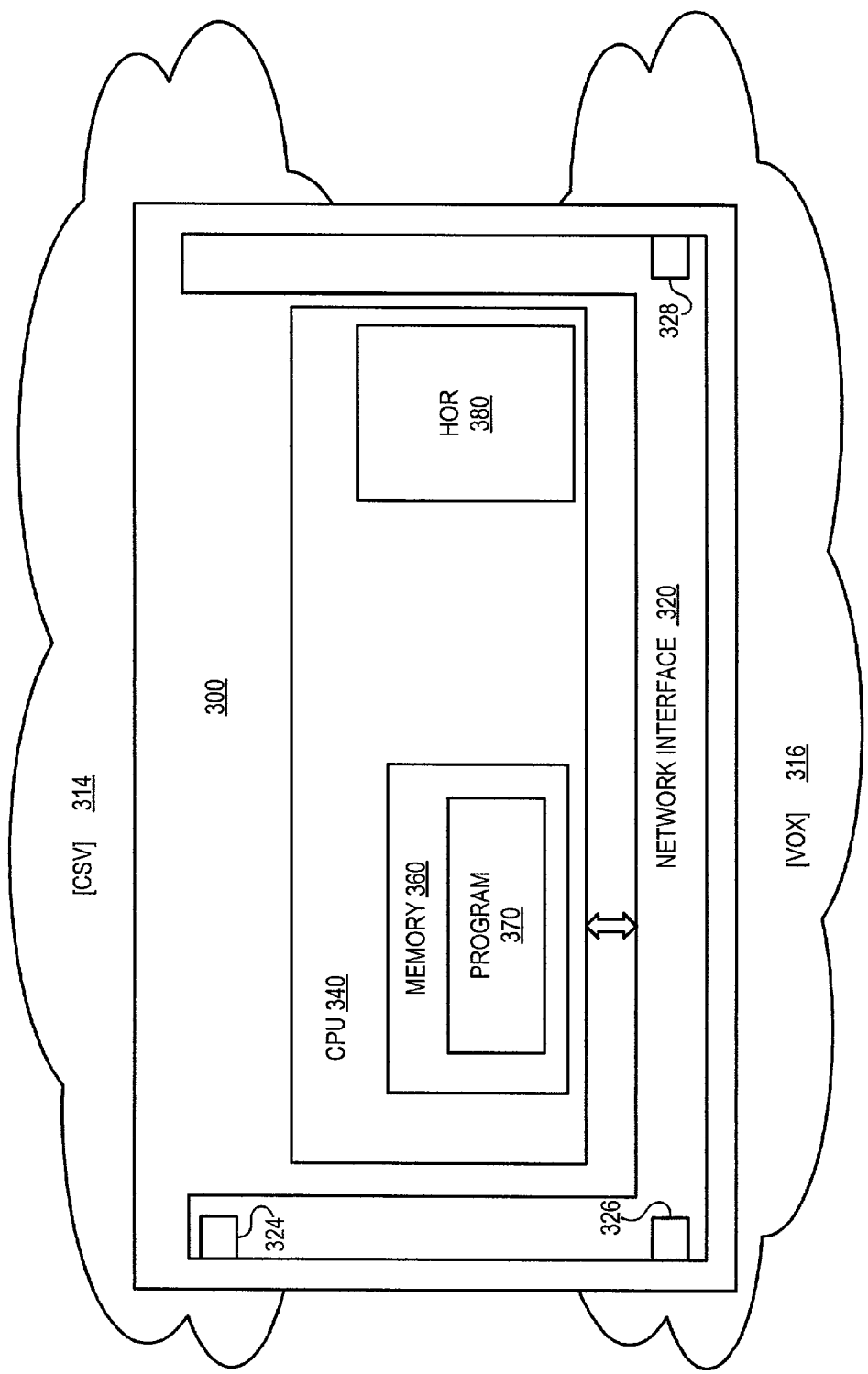
FIG. 3 is a block diagram of a network device made according to an embodiment of the invention.

Referring now to FIG. 3, a network switch 300 made according to an embodiment of the invention is described in more detail. Switch 300 may be any network switch, such as a voice gateway, a gateway, a router, a bridge, etc.

Switch 300 is made to operate concurrently in a CSV network 314 and a VoX network 316. CSV network 314 may be a relevant cellular network, optionally with the Public Switched Telephone Network (PSTN). VoX network 316 is a packet switched network on which a VoX application is running. In some instances of the invention, network 314 and network 316 may be combined into a single network, which may be a hybrid network.

Switch 300 has a network interface 320 for interfacing with networks 314, 316. Network interface 320 may be implemented by two components, namely a CSV component and a VoX component, as will be clear to a person skilled in the art.

Network interface 320 may have a CSV port 324 and a VoX port 326. CSV port 324 interfaces with CSV network 314, and VoX port 326 interfaces with VoX network 316.

Network interface 320 may also have a general port 328, which is either a CSV port or a VoX port. In either case, general port 328 interfaces with the appropriate one of networks 314, 316. In the case of FIG. 3, port 328 is a VoX port, interfacing with VoX network 316, but that is only as an example, and not as a limitation.

Switch 300 also has a processor 340 coupled with network interface 320. Processor 340 may be implemented as a Digital Signal Processor (DSP), Central Processing Unit (CPU), or any other equivalent way known in the art.

Switch 300 additionally includes a memory 360, on which a program 370 may reside. Functions of processor 340 may be controlled by program 370, as will become apparent from the below.

Processor 340 also includes a handoff functionality HOR 380. This operates to handoff calls, as is described below. In some embodiments, handoff functionality HOR 380 may be implemented through program 370.

Referring now to FIGS. 4A–4E, successive stages are illustrated as network switch 300 uses its handoff functionality HOR 380 to hand off a call according to the invention. The shown sequence of stages is only one of many possible such sequences. For example, the sequence can be inverted as per the above.

In FIGS. 4A–4E, network switch 300 communicates with a device 420, which is also a dual mode device. The handoff takes place between CSV port 324 and VoX port 326.

In addition, network switch 300 ultimately communicates with a telephone 430, which includes a microphone and a speaker. The communication is through a voice channel that starts from port 328.

In other words, network switch 300 facilitates the communication between device 420 and telephone 430. It does that by internally coupling port 328 with the appropriate one of ports 324, 326.

Figure 4A:
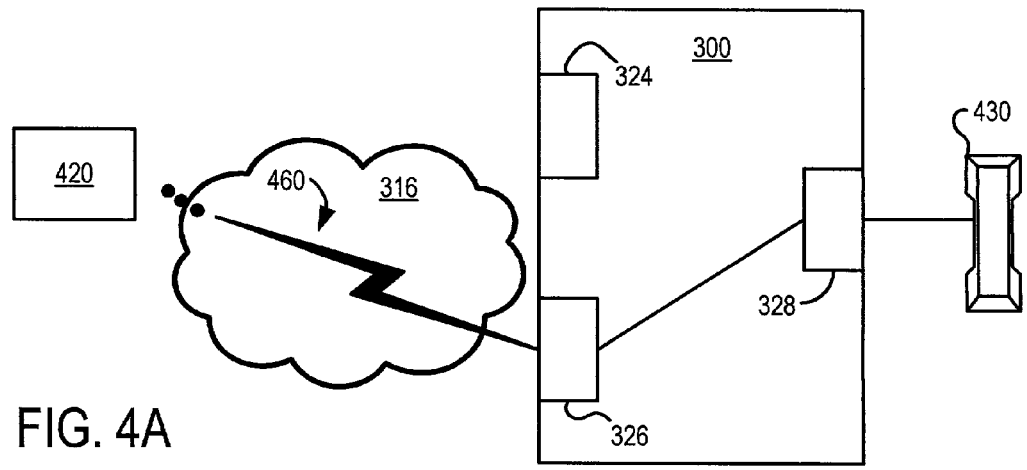
FIGS. 4A–4E are diagrams illustrating successive stages as the device of FIG. 3 implements a method according to the invention.

As seen in FIG. 4A, network switch 300 establishes a VoX connection 460 with VoX port 326 through VoX network 316. Port 326 is additionally coupled with port 328.

Figure 4B:
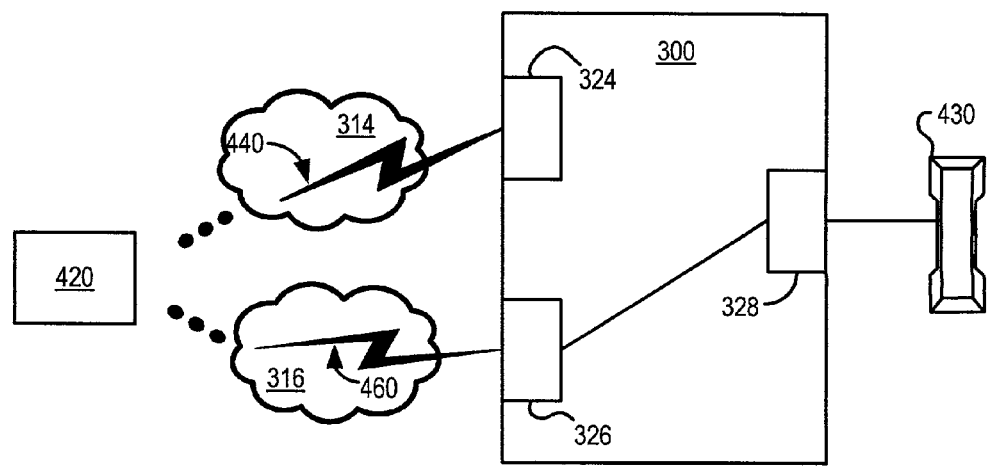

Next, as seen in FIG. 4B, network switch 300 establishes an additional CSV connection 440 with CSV port 324 through CSV network 314. This is preferably while connection 460 is still established.

Figure 4C:
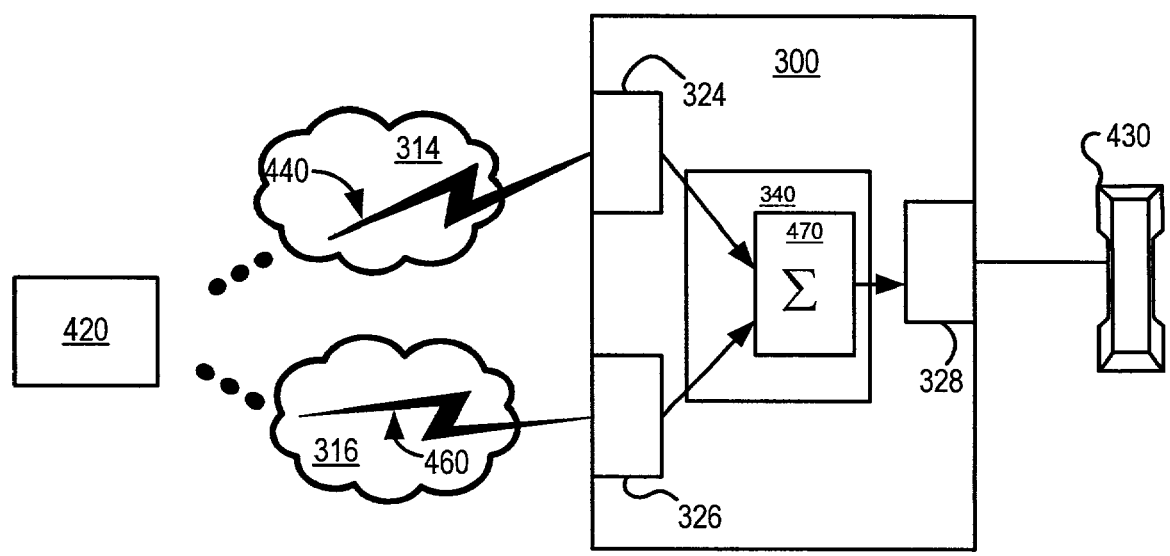

Referring next to FIG. 4C, an optional step is seen. Both CSV connection 440 and VoX connection 460 are established. Data goes from telephone 430, through port 328 to device 420 through either CSV connection 440 or VoX connection 460.

In addition, data is received from both CSV connection 440 and VoX connection 460. The received data is then added in an adder 470 of processor 340. The added data is played to telephone 430 through port 328.

Figure 4D:
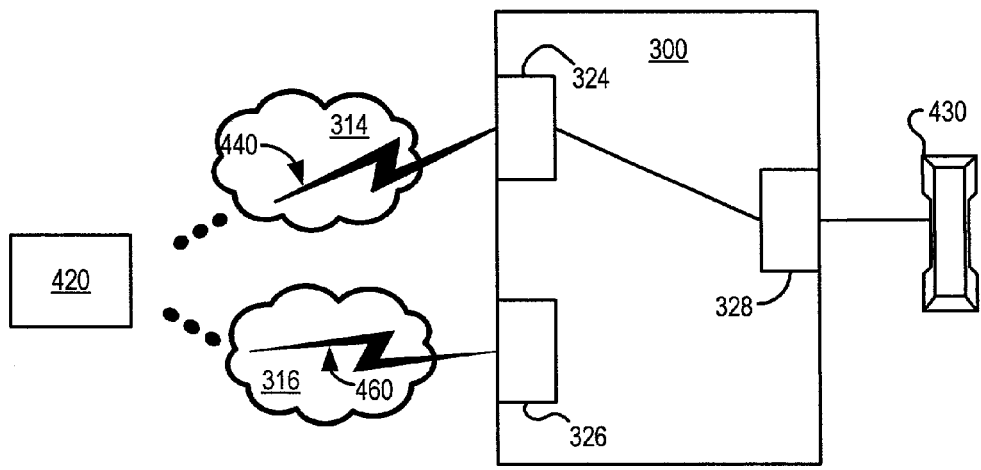

Next, as seen in FIG. 4D, network switch 300 uses VoX connection 440 exclusively. Port 324 is additionally coupled with port 328. That maybe while connection 460 is still established.

Figure 4E:
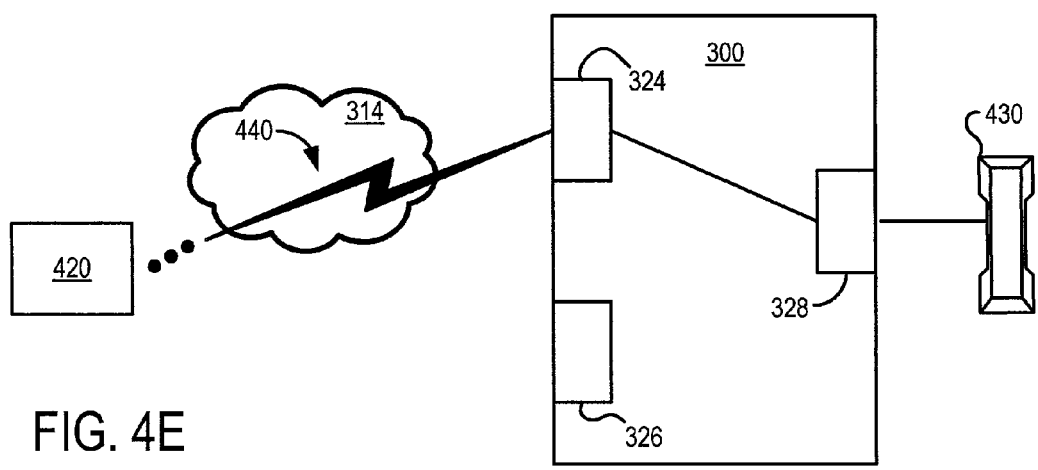

Next, as seen in FIG. 4E, VoX connection 460 is torn down.

It will be appreciated that the illustrated sequence is a make-before-break sequence. In other words, connection 440 is made before connection 460 is torn down.

The present invention may be implemented by one or more devices that include logic circuitry. The device performs functions and/or methods as are described in this document. The logic circuitry may include a processor that may be programmable for a general purpose, or dedicated, such as microcontroller, a microprocessor, a Digital Signal Processor (DSP), etc. For example, the device may be a digital computer like device, such as a general-purpose computer selectively activated or reconfigured by a computer program stored in the computer.

Moreover, the invention additionally provides methods, which are described below. The methods and algorithms presented herein are not necessarily inherently associated with any particular computer or other apparatus. Rather, various general-purpose machines may be used with programs in accordance with the teachings herein, or it may prove more convenient to construct more specialized apparatus to perform the required method steps. The required structure for a variety of these machines will become apparent from this description.

In all cases there should be borne in mind the distinction between the method of the invention itself and the method of operating a computing machine. The present invention relates both to methods in general, and also to steps for operating a computer and for processing electrical or other physical signals to generate other desired physical signals.

The invention additionally provides programs, and methods of operation of the programs. A program is generally defined as a group of steps leading to a desired result, due to their nature and their sequence. A program made according to an embodiment of the invention is most advantageously implemented as a program for a computing machine, such as a general-purpose computer, a special purpose computer, a microprocessor, etc.

The invention also provides storage media that, individually or in combination with others, have stored thereon instructions of a program made according to the invention. A storage medium according to the invention is a computer-readable medium, such as a memory, and is read by the computing machine mentioned above.

The steps or instructions of a program made according to an embodiment of the invention requires physical manipulations of physical quantities. Usually, though not necessarily, these quantities may be transferred, combined, compared, and otherwise manipulated or processed according to the instructions, and they may also be stored in a computer-readable medium. These quantities include, for example electrical, magnetic, and electromagnetic signals, and also states of matter that can be queried by such signals. It is convenient at times, principally for reasons of common usage, to refer to these quantities as bits, data bits, samples, values, symbols, characters, images, terms, numbers, or the like. It should be borne in mind, however, that all of these and similar terms are associated with the appropriate physical quantities, and that these terms are merely convenient labels applied to these physical quantities, individually or in groups.

This detailed description is presented largely in terms of flowcharts, display images, algorithms, and symbolic representations of operations of data bits within at least one computer readable medium, such as a memory. An economy is achieved in the present document in that a single set of flowcharts is used to describe both methods of the invention, and programs according to the invention. Indeed, such descriptions and representations are the type of convenient labels used by those skilled in programming and/or the data processing arts to effectively convey the substance of their work to others skilled in the art. A person skilled in the art of programming may use these descriptions to readily generate specific instructions for implementing a program according to the present invention.

Often, for the sake of convenience only, it is preferred to implement and describe a program as various interconnected distinct software modules or features, individually and collectively also known as software and softwares. This is not necessary, however, and there may be cases where modules are equivalently aggregated into a single program with unclear boundaries. In any event, the software modules or features of the present invention may be implemented by themselves, or in combination with others. Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network, such as a local access network (LAN), or a global network, such as the Internet.

It will be appreciated that some of these methods may include software steps which may be performed by different modules of an overall parts of a software architecture. For example, data forwarding in a router may be performed in a data plane, which consults a local routing table. Collection of performance data may also be performed in a data plane. The performance data may be processed in a control plane, which accordingly may update the local routing table, in addition to neighboring ones. A person skilled in the art will discern which step is best performed in which plane.

In the present case, methods of the invention are implemented by machine operations. In other words, embodiments of programs of the invention are made such that they perform methods of the invention that are described in this document. These may be optionally performed in conjunction with one or more human operators performing some, but not all of them. As per the above, the users need not be collocated with each other, but each only with a machine that houses a portion of the program. Alternately, some of these machines may operate automatically, without users and/or independently from each other.

It will be appreciated that some of these methods may include software steps which may be performed by different modules of an overall parts of a software architecture. For example, data forwarding in a router may be performed in a data plane, which consults a local routing table. Collection of performance data may also be performed in a data plane. The performance data may be processed, and accordingly used in a control plane to update the local routing table, in addition to neighboring ones. A person skilled in the art will discern which step is best performed in which plane.

Methods of the invention are now described.

Figure 5:
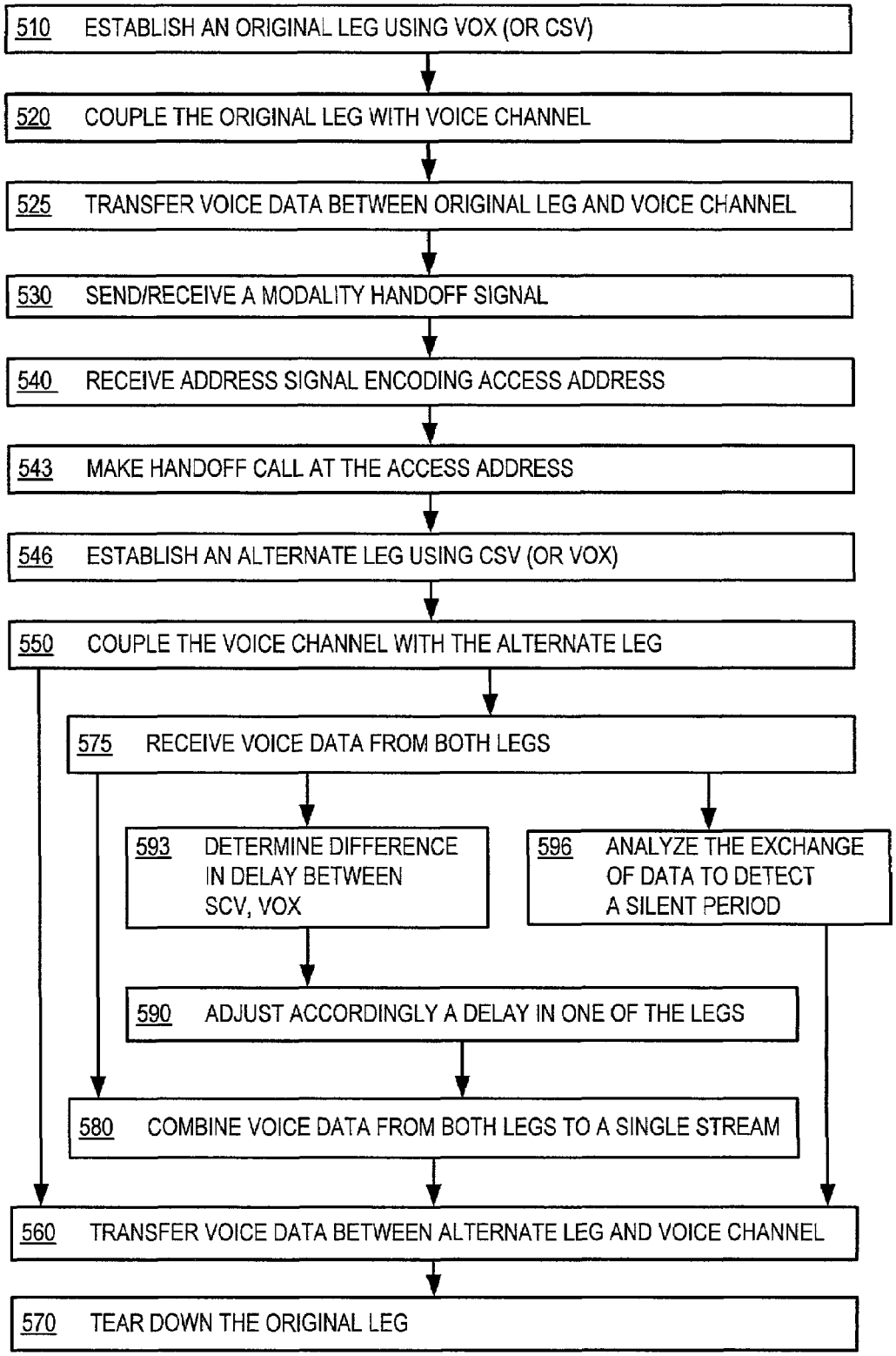
FIG. 5 is a flowchart illustrating a method according to an embodiment of the present invention.

Referring now to FIG. 5, a flowchart 500 is used to illustrate a method according to another embodiment of the invention. The method of flowchart 500 may also be practiced by device 100 of FIG. 1, and device 300 of FIG. 3.

According to a box 510, an original leg of a telephone call connection is established. The connection uses the VoX modality or the CSV modality.

The connection is with a remote device, such a device 220. This applies whether device 220 is a single unit, or a group of units, in one or more networks.

According to an optional next box 520, the original leg is coupled with a voice channel for transferring data between them. The voice channel may be internal within a device or external, and terminates in at least one of a speaker and a microphone. When the voice channel is external, it may use an outgoing call leg over a circuit switched or packet switched network.

According to a next box 525, data of a voice conversation is transferred between the original leg and the voice channel. The data is transferred pursuant to the telephone call connection.

According to an optional next box 530, a modality handoff signal is exchanged with the remote device. This is to signify that the handoff process is to start, and may be performed automatically, without the user initiating it.

Exchanging the modality handoff signal may be performed by transmitting it to the remote device over the original leg. Alternately, exchanging the modality handoff signal is performed by receiving it from the remote device over the original leg.

According to a next box 540, an address signal is received from the remote device. The address signal encodes an access address. Preferably the address signal is received responsive to exchanging the modality handoff signal. Alternately, the address signal is received responsive to querying.

Depending on the modality, the access address may be a Dial Number (DN) for a CSV connection, or a port address for a VoX connection, or an Automatic Number Identification (ANI). The ANI may be a series of digits included in the call, identifying the telephone number of the calling device. In other words, ANI identifies the number of the calling party.

According to a next box 543, a handoff call is made to the access address. The handoff call is made responsive to receiving the address signal, automatically and with no user interaction.

According to a next box 546, an alternate leg of the telephone call connection with the remote device is established from the handoff call. This is made while the original leg is still established. The alternate leg uses the opposite modality from that of the original leg established at box 510.

According to an optional next box 550, the alternate leg is coupled with the voice channel.

According to a next box 560, data of the voice conversation is transferred between the voice channel and the alternate leg. The data is transferred pursuant to the telephone call connection.

According to a next box 570, the original leg is torn down. That takes place while transferring data of the voice conversation between the voice channel and the alternate leg.

According to an optional box 575, prior to box 560, data is received from both the original leg and the alternate leg. According to a next box 580, the received data is combined to form a combined data stream of a single modality (either CSV or VoX). Prior to combining, one of the data streams is converted to be of the other modality.

Box 580 thus accomplishes a soft handoff, for a certain handoff period. If done by a voice gateway, it may use VoX frames when there is no packet loss, and CSV frames where there is packet loss.

According to an optional box 590, a delay is adjusted in either the original leg or alternate leg, to synchronize the voice data streams. This is performed prior to combining in box 580.

According to another box 593, a difference in delay is determined between transferring data along the original leg and along the alternate leg. This is performed for the adjustment of box 590.

Alternately, according to another box 596, the exchange of data is analyzed to detect a silent period, prior to the transfer of box 560.

Figure 6:
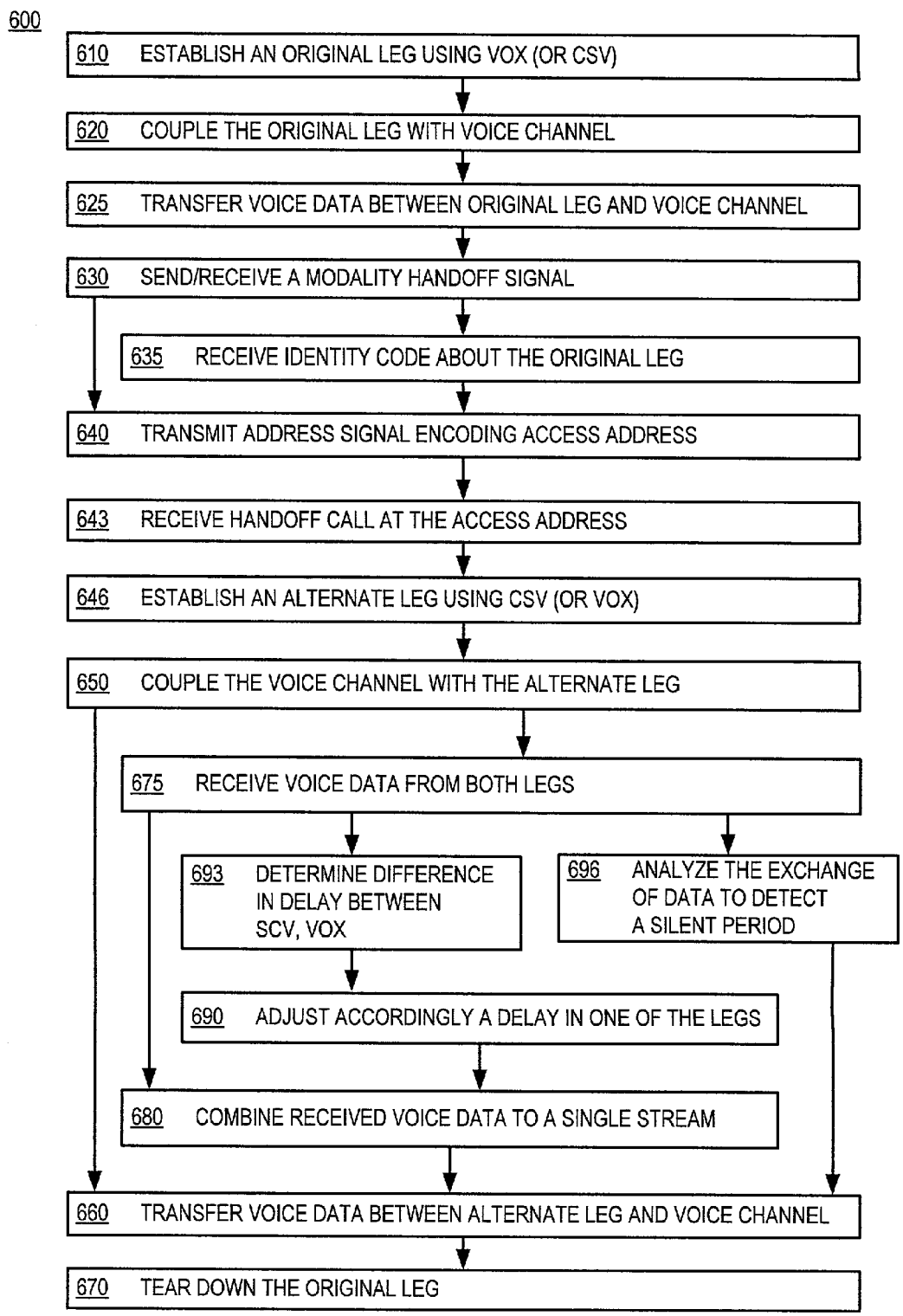
FIG. 6 is a flowchart illustrating a method according to yet another embodiment of the present invention.

Referring now to FIG. 6, a flowchart 600 is used to illustrate a method according to yet another embodiment of the invention. The method of flowchart 600 may also be practiced by device 100 of FIG. 1, and device 300 of FIG. 3.

According to a box 610, an original leg of a telephone call connection is established. The connection is with a remote device, and uses the VoX modality. Alternatively, the connection may use the CSV modality.

According to an optional next box 620, the original leg is coupled with a voice channel for transferring data between them. The voice channel may be internal within a device or external, and terminates in at least one of a speaker and a microphone.

According to a next box 625, data of a voice conversation is transferred between the original leg and the voice channel. The data is transferred pursuant to the telephone call connection.

According to an optional next box 630, a modality handoff signal is exchanged with the remote device. This is to signify that the handoff process is to start, and may be performed automatically, without the user initiating it.

Exchanging the modality handoff signal may be performed by transmitting it to the remote device over the original leg. Alternately, exchanging the modality handoff signal is performed by receiving it from the remote device over the original leg.

According to a next box 635, an identity code is received from the remote device about the original leg.

According to an optional next box 640, an address signal is transmitted to the remote device. The address signal encodes an access address. Preferably the address signal is received responsive to exchanging the modality handoff signal. Depending on the modality, the access address may be a dial number for a CSV connection, or a port address for a VoX connection.

According to a next box 643, a handoff call is received at the access address. The handoff call is expected to be received, responsive to transmitting the address signal.

According to a next box 646, an alternate leg of the telephone call connection with the remote device is established from the handoff call. This is made while the original leg is still established. The alternate leg uses the opposite modality from that of the original leg established at box 610.

According to an optional next box 650, the alternate leg is coupled with the voice channel. The identity code is used to identify the appropriate port, for appropriate matching.

According to a next box 660, data of the voice conversation is transferred between the voice channel and the alternate leg. The data is transferred pursuant to the telephone call connection.

According to a next box 670, the original leg is torn down. That takes place while transferring data of the voice conversation between the voice channel and the alternate leg.

According to an optional box 675, prior to box 660, data is received from both the original leg and the alternate leg. According to a next box 680, the received data is combined to form a combined data stream of a single modality (either CSV or VoX). Prior to combining, one of the data streams is converted to be of the other modality. This is analogous to the soft handoff of boxes 575 and 580.

According to an optional box 690, a delay is adjusted in either the original leg or alternate leg, to synchronize the voice data streams. This is performed prior to combining in box 680.

According to another box 693, a difference in delay is determined between transferring data along the original leg and along the alternate leg. This is performed for the adjustment of box 690.

Alternately, according to another box 696, the exchange of data is analyzed to detect a silent period, prior to the transfer of box 660.

A person skilled in the art will be able to practice the present invention in view of the description present in this document, which is to be taken as a whole. Numerous details have been set forth in order to provide a more thorough understanding of the invention. In other instances, well-known features have not been described in detail in order not to obscure unnecessarily the invention.

While the invention has been disclosed in its preferred form, the specific embodiments as disclosed and illustrated herein are not to be considered in a limiting sense. Indeed, it should be readily apparent to those skilled in the art in view of the present description that the invention may be modified in numerous ways. The inventor regards the subject matter of the invention to include all combinations and subcombinations of the various elements, features, functions and/or properties disclosed herein.

The following claims define certain combinations and subcombinations, which are regarded as novel and non-obvious. Additional claims for other combinations and subcombinations of features, functions, elements and/or properties may be presented in this or a related document.

The invention claimed is:

1. A wireless telephone device comprising:
a physical component for wireless communication; and
a processor coupled with the physical component, in which the processor is adapted to establish an original leg of a telephone call connection using one of a CSV modality and a VoX modality;
transfer data of a voice conversation between the original leg and a voice channel that terminates in one of a speaker and a microphone pursuant to the telephone call connection;
exchange a modality handoff signal after transferring voice data over the original leg, wherein exchanging the modality handoff signal is performed over the original leg;
receive an address signal encoding an access address, wherein the access address identifies a handoff device;
make a handoff call to the handoff device responsive to receiving the address signal;
establish from the handoff call an alternate leg of the telephone call connection using the other one of the two modalities while the original leg is still established; and
then transfer data of the voice conversation between the voice channel and the alternate leg pursuant to the telephone call connection.

2. The device of claim 1, in which the processor is further adapted to:
couple the alternate leg with the voice channel for transferring data between them.

3. The device of claim 1, in which the processor is further adapted to:
tear down the original leg while transferring data of the voice conversation between the voice channel and the alternate leg.

4. The device of claim 1,
in which the address signal is received responsive to exchanging the modality handoff signal.

5. The device of claim 1, in which
exchanging the modality handoff signal is performed by transmitting it over the original leg.

6. The device of claim 1, in which
exchanging the modality handoff signal is performed by receiving it over the original leg.

7. The device of claim 1, in which the processor is further adapted to:
access a registration server to learn a first address; and
in which exchanging the modality handoff signal is performed by transmitting it to the first address.

8. A network switch comprising:
a network interface for coupling to a network; and
a processor coupled with the network interface, in which the processor is adapted to establish an original leg of a telephone call connection using one of a CSV modality and a VoX modality;
transfer data of a voice conversation between the original leg and a voice channel that terminates in one of a speaker and a microphone pursuant to the telephone call connection;
exchange a modality handoff signal after transferring voice data over the original leg, wherein exchanging the modality handoff signal is performed over the original leg;
receive an address signal encoding an access address, wherein the access address identifies a handoff device;
make a handoff call to the handoff device responsive to receiving the address signal;
establish from the handoff call an alternate leg of the telephone call connection using the other one of the two modalities while the original leg is still established; and
then transfer data of the voice conversation between the voice channel and the alternate leg pursuant to the telephone call connection.

9. The network switch of claim 8, in which the processor is further adapted to:
couple the alternate leg with the voice channel for transferring data between them.

10. The network switch of claim 8, in which the processor is further adapted to:
tear down the original leg while transferring data of the voice conversation between the voice channel and the alternate leg.

11. The network switch of claim 8,
in which the address signal is received responsive to exchanging the modality handoff signal.

12. The network switch of claim 8, in which
exchanging the modality handoff signal is performed by transmitting it over the original leg.

13. The network switch of claim 8, in which
exchanging the modality handoff signal is performed by receiving it over the original leg.

14. The network switch of claim 8, in which the processor is further adapted to:
access a registration server to learn a first address; and
in which exchanging the modality handoff signal is performed by transmitting it to the first address.

15. The network switch of claim 8, in which the processor is further adapted to:
receive data from both the original leg and the alternate leg; and
combine the data received from the original leg and from the alternate leg to form a combined data stream of a single one of the CSV and VoX modalities.

16. The network switch of claim 15, in which the processor is further adapted to:
convert the data received from one of the original leg and the alternate leg to be of the other one of the CSV and VoX modalities prior to combining.

17. The network switch of claim 15, in which the processor is further adapted to:
determine a difference in delay between transferring data along the original leg and the alternate leg; and
adjusting a delay in one of the original leg and the alternate leg according to the difference.

18. The network switch of claim 8, in which the processor is further adapted to:
receive data from both the original leg and the alternate leg; and
analyze the exchange of data to detect a silent period to determine when to begin transferring data of the voice conversation between the voice channel and the alternate leg.

19. A device comprising:
a network interface for coupling to a network; and
a processor coupled with the network interface, in which the processor is adapted to establish an original leg of a telephone call connection using one of a CSV modality and a VoX modality;
transfer data of a voice conversation between the original leg and a voice channel that terminates in one of a speaker and a microphone pursuant to the telephone call connection;
exchange a modality handoff signal after transferring voice data over the original leg, wherein exchanging the modality handoff signal is performed over the original leg;
transmit an address signal encoding an access address, wherein the access address identifies a handoff device;
receive a handoff call at the handoff device;
establish from the handoff call an alternate leg of the telephone call connection using the other one of the two modalities while the original leg is still established; and
then transfer data of the voice conversation between the voice channel and the alternate leg pursuant to the telephone call connection.

20. The device of claim 19, in which the processor is further adapted to:
couple the alternate leg with the voice channel for transferring data between them.

21. The device of claim 19, in which the processor is further adapted to:
tear down the original leg while transferring data of the voice conversation between the voice channel and the alternate leg.

22. The device of claim 19, in which the processor is further adapted to:
receive an identity code about the original leg; and
use the identity code for coupling the voice channel with the alternate leg.

23. The device of claim 19,
in which the address signal is received responsive to exchanging the modality handoff signal.

24. The device of claim 19, in which
exchanging the modality handoff signal is performed by transmitting it over the original leg.

25. The device of claim 19, in which
exchanging the modality handoff signal is performed by receiving it over the original leg.

26. The device of claim 19, in which the processor is further adapted to:
access a registration server to learn a first address; and
in which exchanging the modality handoff signal is performed by transmitting it to the first address.

27. The device of claim 19, in which the processor is further adapted to:
receive data from both the original leg and the alternate leg; and
combine the data received from the original leg and from the alternate leg to form a combined data stream of a single one of the CSV and VoX modalities.

28. The device of claim 27, in which the processor is further adapted to:
convert the data received from one of the original leg and the alternate leg to be of the other one of the CSV and VoX modalities prior to combining.

29. The device of claim 27, in which the processor is further adapted to:
determine a difference in delay between transferring data along the original leg and the alternate leg; and
adjust a delay in one of the original leg and the alternate leg according to the difference.

30. The device of claim 19, in which the processor is further adapted to:
receive data from both the original leg and the alternate leg; and
analyze the exchange of data to detect a silent period to determine when to begin transferring data of the voice conversation between the voice channel and the alternate leg.

31. A device comprising:
means for establishing an original leg of a telephone call connection using one of a CSV modality and a VoX modality;
means for transferring data of a voice conversation between the original leg and a voice channel that terminates in one of a speaker and a microphone pursuant to the telephone call connection;

means for exchanging a modality handoff signal after transferring voice data over the original leg, wherein exchanging the modality handoff signal is performed over the original leg;

means for receiving an address signal encoding an access address, wherein the access address identifies a handoff device;

means for making a handoff call to the handoff device responsive to receiving the address signal;

means for establishing from the handoff call an alternate leg of the telephone call connection using the other one of the two modalities while the original leg is still established; and means for then transferring data of the voice conversation between the voice channel and the alternate leg pursuant to the telephone call connection.

32. The device of claim 31, further comprising:

means for coupling the alternate leg with the voice channel for transferring data between them.

33. The device of claim 31, further comprising:

means for tearing down the original leg while transferring data of the voice conversation between the voice channel and the alternate leg.

34. The device of claim 31, in which the address signal is received responsive to exchanging the modality handoff signal.

35. The device of claim 31, in which exchanging the modality handoff signal is performed by transmitting it over the original leg.

36. The device of claim 31, in which exchanging the modality handoff signal is performed by receiving it over the original leg.

37. The device of claim 31, further comprising:

means for accessing a registration server to learn a first address; and in which exchanging the modality handoff signal is performed by transmitting it to the first address.

38. The device of claim 31, further comprising:

means for receiving data from both the original leg and the alternate leg; and means for combining the data received from the original leg and from the alternate leg to form a combined data stream of a single one of the CSV and VoX modalities.

39. The device of claim 38, further comprising:

means for converting the data received from one of the original leg and the alternate leg to be of the other one of the CSV and VoX modalities prior to combining.

40. The device of claim 38, further comprising:

means for determining a difference in delay between transferring data along the original leg and the alternate leg; and means for adjusting a delay in one of the original leg and the alternate leg according to the difference.

41. The device of claim 31, further comprising:

means for receiving data from both the original leg and the alternate leg; and means for analyzing the exchange of data to detect a silent period to determine when to begin transferring data of the voice conversation between the voice channel and the alternate leg.

42. A device comprising:

means for establishing an original leg of a telephone call connection using one of a CSV modality and a VoX modality;

means for transferring data of a voice conversation between the original leg and a voice channel that terminates in one of a speaker and a microphone pursuant to the telephone call connection;

means for exchanging a modality handoff signal after transferring voice data over the original leg, wherein exchanging the modality handoff signal is performed over the original leg;

means for transmitting an address signal encoding an access address, wherein the access address identifies a handoff device;

means for receiving a handoff call at the handoff device;

means for establishing from the handoff call an alternate leg of the telephone call connection using the other one of the two modalities while the original leg is still established; and means for then transferring data of the voice conversation between the voice channel and the alternate leg pursuant to the telephone call connection.

43. The device of claim 42, further comprising:

means for coupling the alternate leg with the voice channel for transferring data between them.

44. The device of claim 42, further comprising:

means for tearing down the original leg while transferring data of the voice conversation between the voice channel and the alternate leg.

45. The device of claim 42, further comprising:

means for receiving an identity code about the original leg; and means for using the identity code for coupling the voice channel with the alternate leg.

46. The device of claim 42, in which the address signal is received responsive to exchanging the modality handoff signal.

47. The device of claim 46 in which exchanging the modality handoff signal is performed by transmitting it over the original leg.

48. The device of claim 46, in which exchanging the modality handoff signal is performed by receiving it over the original leg.

49. The device of claim 46, further comprising:

means for accessing a registration server to learn a first address; and in which exchanging the modality handoff signal is performed by transmitting it to the first address.

50. The device of claim 42, further comprising:

means for receiving data from both the original leg and the alternate leg; and means for combining the data received from the original leg and from the alternate leg to form a combined data stream of a single one of the CSV and VoX modalities.

51. The device of claim 50, further comprising:

means for converting the data received from one of the original leg and the alternate leg to be of the other one of the CSV and VoX modalities prior to combining.

52. The device of claim 50, further comprising:

means for determining a difference in delay between transferring data along the original leg and the alternate leg; and means for adjusting a delay in one of the original leg and the alternate leg according to the difference.

53. The device of claim 42, further comprising:

means for receiving data from both the original leg and the alternate leg; and means for analyzing the exchange of data to detect a silent period to determine when to begin transferring data of the voice conversation between the voice channel and the alternate leg.

54. An article comprising: a storage medium, the storage medium having instructions stored thereon, in which when the instructions are executed by at least one device, they result in:
- establishing an original leg of a telephone call connection using one of a CSV modality and a VoX modality;
- transferring data of a voice conversation between the original leg and a voice channel that terminates in one of a speaker and a microphone pursuant to the telephone call connection;
- exchanging a modality handoff signal after transferring voice data over the original leg, wherein exchanging the modality handoff signal is performed over the original leg;
- receiving an address signal encoding an access address, wherein the access address identifies a handoff device;
- making a handoff call to the handoff device responsive to receiving the address signal;
- establishing from the handoff call an alternate leg of the telephone call connection using the other one of the two modalities while the original leg is still established; and
- then transferring data of the voice conversation between the voice channel and the alternate leg pursuant to the telephone call connection.

55. The article of claim 54, in which the instructions further result in:
- coupling the alternate leg with the voice channel for transferring data between them.

56. The article of claim 54, in which the instructions further result in:
- tearing down the original leg while transferring data of the voice conversation between the voice channel and the alternate leg.

57. The article of claim 54,
in which the address signal is received responsive to exchanging the modality handoff signal.

58. The article of claim 57, in which
exchanging the modality handoff signal is performed by transmitting it over the original leg.

59. The article of claim 57, in which
exchanging the modality handoff signal is performed by receiving it over the original leg.

60. The article of claim 57, in which the instructions further result in:
- accessing a registration server to learn a first address; and
- in which exchanging the modality handoff signal is performed by transmitting it to the first address.

61. The article of claim 54, in which the instructions further result in:
- receiving data from both the original leg and the alternate leg; and
- combining the data received from the original leg and from the alternate leg to form a combined data stream of a single one of the CSV and VoX modalities.

62. The article of claim 61, in which the instructions further result in:
- converting the data received from one of the original leg and the alternate leg to be of the other one of the CSV and VoX modalities prior to combining.

63. The article of claim 61, in which the instructions further result in:
- determining a difference in delay between transferring data along the original leg and the alternate leg; and
- adjusting a delay in one of the original leg and the alternate leg according to the difference.

64. The article of claim 54, in which the instructions further result in:
- receiving data from both the original leg and the alternate leg; and
- analyzing the exchange of data to detect a silent period to determine when to begin transferring data of the voice conversation between the voice channel and the alternate leg.

65. An article comprising: a storage medium, the storage medium having instructions stored thereon, in which when the instructions are executed by at least one device, they result in:
- establishing an original leg of a telephone call connection using one of a CSV modality and a VoX modality;
- transferring data of a voice conversation between the original leg and a voice channel that terminates in one of a speaker and a microphone pursuant to the telephone call connection;
- exchanging a modality handoff signal after transferring voice data over the original leg, wherein exchanging the modality handoff signal is performed over the original leg;
- transmitting an address signal encoding an access address, wherein the access address identifies a handoff device;
- receiving a handoff call at the handoff device;
- establishing from the handoff call an alternate leg of the telephone call connection using the other one of the two modalities while the original leg is still established; and
- then transferring data of the voice conversation between the voice channel and the alternate leg pursuant to the telephone call connection.

66. The article of claim 65, in which the instructions further result in:
- coupling the alternate leg with the voice channel for transferring data between them.

67. The article of claim 65, in which the instructions further result in:
- tearing down the original leg while transferring data of the voice conversation between the voice channel and the alternate leg.

68. The article of claim 65, in which the instructions further result in:
- receiving an identity code about the original leg; and
- using the identity code for coupling the voice channel with the alternate leg.

69. The article of claim 65,
in which the address signal is received responsive to exchanging the modality handoff signal.

70. The article of claim 60, in which
exchanging the modality handoff signal is performed by transmitting it over the original leg.

71. The article of claim 60, in which
exchanging the modality handoff signal is performed by receiving it over the original leg.

72. The article of claim 60, in which the instructions further result in:
- accessing a registration server to learn a first address; and
- in which exchanging the modality handoff signal is performed by transmitting it to the first address.

73. The article of claim 65, in which the instructions further result in:
- receiving data from both the original leg and the alternate leg; and combining the data received from the original leg and from the alternate leg to form a combined data stream of a single one of the CSV and VoX modalities.

74. The article of claim 73, in which the instructions further result in:
converting the data received from one of the original leg and the alternate leg to be of the other one of the CSV and VoX modalities prior to combining.

75. The article of claim 73, in which the instructions further result in:
determining a difference in delay between transferring data along the original leg and the alternate leg; and
adjusting a delay in one of the original leg and the alternate leg according to the difference.

76. The article of claim 65, in which the instructions further result in:
receiving data from both the original leg and the alternate leg; and
analyzing the exchange of data to detect a silent period to determine when to begin transferring data of the voice conversation between the voice channel and the alternate leg.

77. A method comprising:
establishing an original leg of a telephone call connection using one of a CSV modality and a VoX modality;
transferring data of a voice conversation between the original leg and a voice channel that terminates in one of a speaker and a microphone pursuant to the telephone call connection;
exchanging a modality handoff signal after transferring voice data over the original leg, wherein exchanging the modality handoff signal is performed over the original leg;
receiving an address signal encoding an access address, wherein the access address identifies a handoff device;
making a handoff call to the handoff device responsive to receiving the address signal;
establishing from the handoff call an alternate leg of the telephone call connection using the other one of the two modalities while the original leg is still established; and
then transferring data of the voice conversation between the voice channel and the alternate leg pursuant to the telephone call connection.

78. The method of claim 77, further comprising:
coupling the alternate leg with the voice channel for transferring data between them.

79. The method of claim 77, further comprising
tearing down the original leg while transferring data of the voice conversation between the voice channel and the alternate leg.

80. The method of claim 77,
in which the address signal is received responsive to exchanging the modality handoff signal.

81. The method of claim 80, in which
exchanging the modality handoff signal is performed by transmitting it over the original leg.

82. The method of claim 80, in which
exchanging the modality handoff signal is performed by receiving it over the original leg.

83. The method of claim 80, further comprising:
accessing a registration server to learn a first address; and
in which exchanging the modality handoff signal is performed by transmitting it to the first address.

84. The method of claim 77, further comprising:
receiving data from both the original leg and the alternate leg; and
combining the data received from the original leg and from the alternate leg to form a combined data stream of a single one of the CSV and VoX modalities.

85. The method of claim 84, further comprising:
converting the data received from one of the original leg and the alternate leg to be of the other one of the CSV and VoX modalities prior to combining.

86. The method of claim 84, further comprising:
determining a difference in delay between transferring data along the original leg and the alternate leg; and
adjusting a delay in one of the original leg and the alternate leg according to the difference.

87. The method of claim 77, further comprising:
receiving data from both the original leg and the alternate leg; and
analyzing the exchange of data to detect a silent period to determine when to begin transferring data of the voice conversation between the voice channel and the alternate leg.

88. A method comprising:
establishing an original leg of a telephone call connection using one of a CSV modality and a VoX modality;
transferring data of a voice conversation between the original leg and a voice channel that terminates in one of a speaker and a microphone pursuant to the telephone call connection;
exchanging a modality handoff signal after transferring voice data over the original leg, wherein exchanging the modality handoff signal is performed over the original leg;
transmitting an address signal encoding an access address, wherein the access address identities a handoff device;
receiving a handoff call at the handoff device;
establishing from the handoff call an alternate leg of the telephone call connection using the other one of the two modalities while the original leg is still established; and
then transferring data of the voice conversation between the voice channel and the alternate leg pursuant to the telephone call connection.

89. The method of claim 88, further comprising:
coupling the alternate leg with the voice channel for transferring data between them.

90. The method of claim 88, further comprising:
tearing down the original leg while transferring data of the voice conversation between the voice channel and the alternate leg.

91. The method of claim 88, further comprising:
receiving an identity code about the original leg; and
using the identity code for coupling the voice channel with the alternate leg.

92. The method of claim 88,
in which the address signal is received responsive to exchanging the modality handoff signal.

93. The method of claim 92, in which
exchanging the modality handoff signal is performed by transmitting it over the original leg.

94. The method of claim 92, in which
exchanging the modality handoff signal is performed by receiving it over the original leg.

95. The method of claim 92, further comprising:
accessing a registration server to learn a first address; and
in which exchanging the modality handoff signal is performed by transmitting it to the first address.

96. The method of claim 88, further comprising:
receiving data from both the original leg and the alternate leg; and
combining the data received from the original leg and from the alternate leg to form a combined data stream of a single one of the CSV and VoX modalities.

97. The method of claim 96, further comprising:
converting the data received from one of the original leg and the alternate leg to be of the other one of the CSV and VoX modalities prior to combining.

98. The method of claim 96, further comprising:
determining a difference in delay between transferring data along the original leg and the alternate leg; and
adjusting a delay in one of the original leg and the alternate leg according to the difference.

99. The method of claim 88, further comprising:
receiving data from both the original leg and the alternate leg; and
analyzing the exchange of data to detect a silent period to determine when to begin transferring data of the voice conversation between the voice channel and the alternate leg.

* * * * *